UNITED STATES PATENT OFFICE 2,630,457

BENZYL HYDROXY DIPHENYL POLYGLYCOL ETHERS

Kurt Hans Ernst Hansen, Leverkusen-Bayerwerk, and Othmar Ludwig Drapal, Karl Wilhelm Hintzmann, and Richard Wegler, Leverkusen-Schlebusch, Germany, assignors to Farbenfabriken Bayer, Leverkusen, Germany No Drawing. Application January 12, 1949, Serial No. 70,608. In Germany November 25, 1948

2 Claims. (Cl. 260—613)

The present invention relates to new polyglycol ethers of aromatic hydroxy compounds, which have proved to be excellent emulsifying and dispersing agents. The invention relates more particularly to polyglycol ethers of aromatic hydroxy compounds containing at least three isocyclic rings. These new polyglycol ethers correspond to the following general formula:

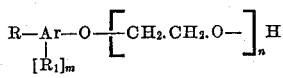

In this formula Ar stands for a benzene nucleus or two condensed benzene nuclei, i. e. a naphthalene nucleus; R stands for an isocyclic radical, such as phenyl, cyclohexyl or benzyl; $R_1$ stands for hydrogen or R; $m$ means 1 or 2, and $n$ means an integer from 6 to 30. In case Ar stands for a benzene nucleus $R_1$ cannot be hydrogen but must necessarily be at least one of the R radicals in order to have three isocyclic rings in the compound. If $R_1$ stands for R the radicals may be the same or different.

The new compounds can be obtained in known manner by reacting the substituted aromatic hydroxy compounds, i. e. the substituted phenols or naphthols with ethylene oxide. For further details concerning the reaction see for example the U. S. Patents Nos. 2,213,477 and 1,970,578, as well as the German Patent No. 605,973. The starting materials, the substituted phenols and naphthols are likewise obtained in the usual known manner by condensing phenols or naphthols with the chloroderivates of the substituents in the presence of a Friedel-Crafts catalyst. Such condensation is described for example in the U. S. Patent No. 2,213,477, Beilstein's "Handbuch der Organischen Chemie," vol. 6, pages 583 and 675, vol. 6, 1st supplement, pages 295 and 324, vol. 6, 2nd supplement, pages 548–9 and 628–30, and "Journal of the American Chemical Society," vol. 50, pages 2454 and following.

As examples for the substituted aromatic hydroxy compounds which may be used as starting materials the following may be mentioned: benzyl p-hydroxydiphenyl, benzyl o-hydroxydiphenyl, dibenzyl phenol, tribenzyl phenol, dibenzyl hydroxydiphenyl, benzyl naphthol, dicyclohexyl phenol, tricyclohexyl phenol, cyclohexyl p-hydroxydiphenyl, cyclohexyl o-hydroxydiphenyl, cyclohexyl p-hydroxydiphenyl-methane, dicyclohexyl hydroxydiphenyl-methane, cyclohexyl naphthol. They are obtainable e. g. by condensing chlorobenzene, cyclohexyl chloride or benzyl chloride with phenol, hydroxydiphenyl or naphthol in the presence e. g. of aluminium chloride, zinc dust or any catalyst of similar action. Compounds such as cyclohexyl-benzyl-phenol may be obtained either by condensing cyclohexyl phenol with benzyl chloride or by condensing hydroxydiphenyl with cyclohexyl chloride. These starting materials may, of course, be further substituted e. g. by alkyl groups; thus e. g. instead of phenol a cresol may be used etc. It is further not necessary to use pure substituted aromatic hydroxy compounds; also the technical mixtures may be used as they are obtained by the introduction of the substituents.

The number of ethylene oxide molecules combined with one molecule of the substituted aromatic hydroxy compounds depends on the intended use of the polyglycol ethers thus prepared and may vary between 5 and 30 molecules of ethylene oxide per one molecule of substituted aromatic hydroxy compounds; preferably 12 to 20 molecules of ethylene oxide are introduced into one molecule of the substituted aromatic hydroxy compounds, since the new polyglycol ethers built up in this ratio show excellent emulsifying and dispersing properties for the most purposes.

The new compounds are of oily to waxy consistency at room temperature. They are in water emulsifiable or soluble, depending on the number of ethylene oxide molecules introduced. By means of this new emulsifying and dispersing agents water-insoluble substances may be very finely dispersed or emulsified so that in many cases solutions are obtained which are almost optically clear. By this property the new compounds differ fundamentally from the emulsifying and dispersing agents hitherto used. This fact is very surprising, since polyglycol ethers of alkyl-substituted aromatic hydroxy compounds are well known emulsifying and dispersing agents, and it was assumed that the capillary active properties of these compounds are promoted by longer also branched aliphatic radicals, while now these enhanced properties are obviously caused by the introduction of isocyclic substituents.

The new emulsifying and dispersing agents may be used in the most different fields of application. They may be used for the preparation of aqueous mineral oil emulsions; they may be applied in the textile industry. A further field of application is the emulsification of water-insoluble pesticides which are to be applied in aqueous dilutions. They may be used in making up dyestuff pastes as they are employed in dyeing and printing. Another use of the new compounds is their combined application with fat solvents for cleaning and fat-removing purposes as they may also be used in combination with the various known textile assistants.

The following examples illustrate the invention without limiting it thereto; the parts being by weight:

Example 1

50 parts of benzyl p-hydroxydiphenyl polyglycol ether (prepared from the distilled reaction product of benzyl chloride with p-hydroxydiphenyl and 16 mols of ethylene oxide) are mixed with 50 parts of methylcyclohexanol. There is obtained a solution which clearly dissolves in water and is excellently suited for degreasing materials in aqueous solution. The mixture may also be used with advantage for cleaning textiles.

Example 2

100 parts of a water-insoluble organic compound which, for instance, can be used as insecticide, are finely pulverized and mixed with 15 parts of benzyl p-hydroxydiphenyl polyglycol ether (prepared from the crude reaction product of benzyl chloride with p-hydroxydiphenyl and 17 mols of ethylene oxide) with the addition of 100 parts of water. A fine-grained dispersion is obtained which can be easily distributed in water and into which, for instance, objects to be treated are dipped. By this process the active, e. g. insecticidal components are very finely spread over the material, especially over textiles.

Example 3

100 parts of ultramarine are ground in a ball mill with the addition of 10 parts of benzyl p-hydroxydiphenyl polyglycol ether and 100 parts of water. An especially fine dispersion of the pigment is obtained which is suitable for painting or blueing textiles.

Example 4

50 parts of mineral oil, 50 parts of train oil are mixed while adding 20 parts of water with 15 parts of benzyl o-hydroxydiphenyl polyglycol ether (prepared by benzylation of o-hydroxydiphenyl according to Friedel-Crafts and subsequent reaction with 17 mols of ethylene oxide in the presence of catalytic quantities of NaOH) and the mixture thus obtained is emulsified by adding it slowly to water while stirring. A white, very stable emulsion is obtained, which can preferably be used in the textile industry, especially for batching jute.

Example 5

20 parts of mineral oil are pasted with 10 parts of benzyl $\beta$-naphthol polyglycol ether (prepared by benzylation of $\beta$-naphthol according to Friedel-Crafts and subsequent reaction with 19 mols of ethylene oxide in the presence of catalytic quantities of NaOH) and 5 parts of water, and this paste is diluted to an emulsion by adding further 65 parts of water. This mineral oil emulsion is very highly dispersed and may preferably be used as boring oil.

Example 6

30 parts of olein are mixed with 10 parts of dibenzyl phenol polyglycol ether (prepared by benzylation of phenol in the presence of iron or aluminium chloride and subsequent reaction with 14 mols of ethylene oxide) and 10 parts of water, and this mixture is stirred with 45 parts of water yielding a white emulsion. This emulsion can be used in the textile industry in greasing wool and has the advantage of being readily washed out again.

Example 7

100 parts of carbon black are ground in a ball mill with 10 parts of dibenzyl phenol polyglycol ether (prepared as described above) and 300 parts of water. A non-settling carbon black dispersion is formed which owing to its good penetrating property may preferably be used for staining wood.

A dispersion of practically the same properties may be obtained when using 10 parts of cyclohexyl $\beta$-naphthol polyglycol ether (prepared by condensing $\beta$-naphthol with chlorocyclohexane or cyclohexene and subsequent reaction with 16 mols of ethylene oxide) instead of dibenzyl phenol polyglycol ether.

Example 8

100 parts of a water-insoluble organic compound or a mixture of such compounds which, for instance, are suitable as insecticides, are liquefied either by merely heating or by dissolving in 20–30 parts of a suitable organic solvent and homogeneously mixed with 80–120 parts of a technical benzyl p-hydroxydiphenyl polyglycol ether [prepared from the crude reaction product of 100 parts of p-hydroxydiphenyl with 90 parts of benzyl chloride and subsequent reaction with about 300 parts of ethylene oxide. The reaction product contains the polyglycol ethers of p-hydroxydiphenyl (about 6%), benzyl p-hydroxydiphenyl (about 61%) and dibenzyl p-hydroxydiphenyl (about 33%)]. Thus stable, highly concentrated insecticidal compositions are obtained which are clearly soluble in cold water and on applying them e. g. to surfaces dry without leaving any visible residue. These compositions, therefore, can not only be used as insecticides in the usual manner but also for combating pests in furnished rooms.

Example 9

25 parts of cyclohexyl p-hydroxydiphenyl polyglycol ether (obtained, for instance, by condensing chlorocyclohexane with p-hydroxydiphenyl and subsequent treatment with 18 mols of ethylene oxide) are mixed with 75 parts of cyclohexanol. This solution can be diluted with water to a clear solution, and shows excellent cleaning properties for textile materials.

Example 10

50 parts of p-dichloro-diphenyl-trichloroethane are dissolved in 100 parts of trichloroethylene to which 60 parts of cyclohexyl p-hydroxyldiphenyl polyglycol ether are added. This solution can be diluted with water to a white emulsion which may be used for combating insects.

Example 11

100 parts of titanium dioxide are ground in a ball mill with 10 parts of cyclohexyl p-hydroxydiphenyl-methane polyglycol ether (prepared, for instance, by condensing chlorocyclohexane with p-hydroxydiphenyl-methane and subsequent reaction with 17 mols of ethylene oxide or by condensing o-cyclohexyl phenol with benzyl chloride and subsequent treatment with ethylene oxide) and 100 parts of water. The dispersion which is very stable in water, may be used for painting purposes.

Example 12

100 parts of a water-insoluble organic compound or a mixture of such compounds as are, for instance, suitable as pesticides, are liquefied either by merely heating or by dissolving in 20 to 50 parts of a suitable organic solvent and homogeneously mixed with 80 to 140 parts of cyclohexyl o-hydroxydiphenyl polyglycol ether (prepared, for instance, by condensing chlorocyclohexane with o-hydroxydiphenyl and subsequent reaction of the distilled product with 16 to 17 mols of ethylene oxide). Thus stable, highly concentrated active compositions are obtained which are clearly soluble in cold water and dry up without leaving a visible residue when applied, for instance, to surfaces. These compositions, therefore, can be used not only for the combating of insects but also of pests in furnished rooms.

Example 13

100 parts of mineral oil are made up to a paste with 20 parts of tricyclohexyl phenol polyglycol ether (prepared from phenol and chlorocyclohexane according to Friedel-Crafts, and by subsequent reaction with 30 mols of ethylene oxide) and 15 parts of water which paste is then diluted with further 850 parts of water. The emulsion obtained is suitable, for instance, for the use as boring oil.

We claim:

1. Polyglycol ethers of aromatic hydroxy compounds containing at least three isocyclic rings corresponding to the general formula:

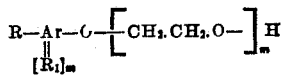

wherein Ar stands for phenyl, R stands for phenyl, $R_1$ stands for benzyl, $m$ means one of the figures 1 and 2, and $n$ means an integer from 12 to 20, said polyglycol ethers being of oily to waxy consistency.

2. Polyglycol ethers of aromatic hydroxy compounds corresponding to the general formula:

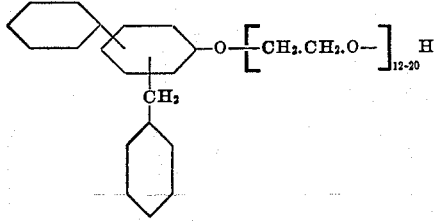

being of oily to waxy consistency.

KURT HANS ERNST HANSEN.
OTHMAR LUDWIG DRAPAL.
KARL WILHELM HINTZMANN.
RICHARD WEGLER.

REFERENCES CITED

The following references are of record in the file of this patent:

UNITED STATES PATENTS

| Number | Name | Date |
| --- | --- | --- |
| 2,176,834 | Bruson | Oct. 17, 1939 |
| 2,213,477 | Steindorff | Sept. 3, 1940 |
| 2,291,528 | Bruson | July 28, 1942 |
| 2,297,728 | Taylor | Oct. 6, 1942 |

OTHER REFERENCES

Fuson et al., "Organic Chemistry" (1942), page 432, John Wiley and Sons, New York, N. Y. (Not available for photostatic copies.)